United States Patent
Rosno et al.

(10) Patent No.: US 6,535,986 B1
(45) Date of Patent: Mar. 18, 2003

(54) OPTIMIZING PERFORMANCE OF A CLOCKED SYSTEM BY ADJUSTING CLOCK CONTROL SETTINGS AND CLOCK FREQUENCY

(75) Inventors: Patrick Lee Rosno, Rochester, MN (US); James David Strom, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/524,878

(22) Filed: Mar. 14, 2000

(51) Int. Cl.[7] .............................. G06F 1/08; G06F 1/04
(52) U.S. Cl. .................. 713/400; 713/500; 713/501
(58) Field of Search .................. 713/400, 401, 713/500, 501; 714/724, 736

(56) References Cited

U.S. PATENT DOCUMENTS

| | | | | |
|---|---|---|---|---|
| 5,455,931 A | * | 10/1995 | Camporese et al. | 713/501 |
| 5,613,077 A | * | 3/1997 | Leung et al. | 710/305 |
| 5,661,731 A | * | 8/1997 | Yip et al. | 714/724 |
| 5,663,991 A | | 9/1997 | Kelkar et al. | 375/376 |
| 5,708,801 A | | 1/1998 | Williams et al. | 395/551 |
| 5,802,355 A | | 9/1998 | Arroyo et al. | 395/553 |
| 5,828,255 A | | 10/1998 | Kelkar et al. | 327/157 |
| 5,828,593 A | * | 10/1998 | Schultz et al. | 365/49 |
| 5,930,182 A | | 7/1999 | Lee | 365/194 |
| 6,438,722 B1 | * | 8/2002 | Bailey et al. | 714/736 |

FOREIGN PATENT DOCUMENTS

| | | | |
|---|---|---|---|
| EP | 0706108 A2 | 9/1995 | G06F/1/08 |
| EP | 0493001 B1 | 9/1996 | G06F/1/10 |
| WO | WO9535540 | 12/1995 | G06F/13/00 |
| WO | WO9736370 | 10/1997 | H03B/19/00 |
| WO | WO9938251 | 7/1999 | H03B/5/08 |

* cited by examiner

*Primary Examiner*—Thomas Lee
*Assistant Examiner*—Mark Connolly
(74) *Attorney, Agent, or Firm*—Karuna Ojanen

(57) ABSTRACT

A method of adjusting the operating or timing margin of a clocked system, such as a digital computer or a memory controller, is disclosed. The method may be automated to occur upon every initial program load or can be manually adjusted for changes in frequency, operating voltages, or applications in which the timing margin is not so critical. An initial or default frequency of the clock is set. Clock control settings, such as duty cycle, VCO range and gain, etc, are also initialized and set as some default. Test, such as ABIST, LBIST or other functional tests, are performed on the clocked system and the clock frequency is incrementally increased until the tests fail. Upon failure of the tests, one or more clock control settings are adjusted and the tests are run again at the failing frequency. If the tests successfully complete, indicating no errors, the clock frequency is incremented again until the test fail. Again, the clock control settings are adjusted and the tests are repeated at increasing frequency until failure of the tests or until a desired timing margin is reached.

11 Claims, 2 Drawing Sheets

OPTIMIZING PERFORMANCE OF A CLOCKED SYSTEM BY ADJUSTING CLOCK CONTROL SETTINGS AND CLOCK FREQUENCY

TECHNICAL FIELD

This invention relates generally to the field of clocking circuits and more particularly relates to increasing the timing margin of a clock signal throughout a clocked system by adjusting clock control settings relative to clock frequency.

BACKGROUND OF THE INVENTION

In order for electronic systems such as computers and computer memory devices to operate properly and reliably, the timing specifications of each integrated circuit in the system must be thoroughly characterized and guaranteed. Manufacturers of integrated circuits of semiconductor devices categorize these circuits by speed grade which designates the preferred speed for proper operation. Ideally, the manufacturer tests each integrated circuit as it is produced. If the integrated circuit passes the timing requirements for the targeted speed grade, it is sold at the corresponding prices; typically the price of a circuit increases with the operating speed of the circuit. If the integrated circuit fails, it may be down-graded to a lower speed grade and sold for a lower price.

In order to meet the requirements of a particular speed grade the integrated circuit must meet several different timing specifications. For example, consider a system of many integrated circuits in which a digital logic signal, typically a square wave, is transmitted on common bus between two integrated circuits controlled by a common clock. For proper communication it is critical that the signal arrive at the receiving integrated circuit no later than a specified time, sometimes on the order of hundreds of picoseconds, after a relevant edge, e.g., the rising edge, of a previous clock signal. This specified time or margin allows the semiconductor devices to stabilize and correctly receive the input signal before the next edge of interest which may be a rising or a falling edge of the clock when the data is latched by the receiving integrated circuit. Similarly, the integrated circuit transmitting the logic signals must continue to provide the data to the receiving circuit for a specified time after the rising edge of the first clock signal. This ensures that the receiving circuit has completely latched the input signal before the signal is removed from the bus.

Generally, clock signals toggle as fast as or faster than any other signals in a digital processing system. For every data transition, a clock must undergo two transitions. Not only are clocks the fastest signals, they are also the most heavily loaded because clocks are connected to every latch in a system whereas individual data wires fan out to relatively only a few integrated circuits. In order for a clock signal to propagate through a system, it is preferable that the timing margin be as large as possible given faster and faster clock frequencies. The timing margin measures the slack or the excess time remaining in each clock cycle after it has received a logic signal. The timing margin depends on both the delay of logic paths and the clock interval. Too short a clock interval can cause a timing margin failure.

Typically, during testing and during initial program load, various tests are run on the functions on the microprocessor and memory nest integrated circuits. These tests include Logic/Array Built-In-Self Tests (LBIST and ABIST). These are dynamic frequency tests that are run at chip and module level to test the operating frequency of logic and arrays. It is suggested to never operate a circuit near its failure frequency, especially if there is minimal timing margin. It is always preferable to reduce the maximum operating speed for any circuit somewhat below the frequency at which the tests fail, leaving a small positive timing margin under all operating conditions. A positive timing margin protects the integrated circuits against signal crosstalk which perturbs the edge transition times, general miscalculations that often occur when counting logic delays, and later minor changes in the circuit card design or layout.

Several components affect the timing margin; one such is the clock skew which can be considered as the maximum difference in the arrival time of the clocks between any two latches or flip-flops. The skew can be positive or negative depending upon the routing direction and the position of the clock source. Quite simply, the clock period between any two latches must be large enough for the data to latch or the computations to settle. Another aspect of the timing margin is the clock jitter. Jitter refers to the change in the timing of the clock from period to period. Temperature affects jitter as when an oscillator warms, it may gradually change in frequency, voltage, and or phase. Other factors affecting skew and/or jitter are the impedance of the distribution lines, the impedance of the clock drivers, the crosstalk between two signal lines, delays, etc.

An important concept is the duty cycle which is considered as the time a signal is in its high state divided by the signal's period. An ideal duty cycle for a clock signal is fifty percent, i.e., the falling edge of the ideal clock signal precisely bisects successive rising edges so that the average voltage of the ideal clock lies halfway between its high and low states. The symmetry of a clock signal is another way of looking at the duty cycle; if the clock signal is symmetrical, then its period is equally divided between its high voltage, $V_{dd}$, and its low voltage, typically ground, and the amplitude of the high voltage is as much above a reference voltage as the low voltage is below the reference voltage. But clocks become unbalanced drifting away from a fifty percent duty cycle because circuit elements have an asymmetric response to the rising and falling voltages of the waveforms. Indeed, it has been discovered that some technologies and some circuits, such as silicon-on insulator and copper, are sensitive to either one or the other of the rising or falling waveforms and therefore a duty cycle other than fifty percent is deemed desirable.

A microprocessor, a bus arbitration logic unit, a memory controller or other computer circuits typically have a phase locked loop (PLL), a Digital Multiplier (DM), or a Symmetry Correction Circuitry (SCC) to generate the clock for the chip. These circuits may have inputs that can be adjusted to change characteristics of the generated clock signal. Typically, adjusting these clock settings is done by measuring and characterizing a few systems using a service processor and then using the same inputs for each system or clock. This may be very well and good when a system operates at only one frequency or at only one operating voltage but today's systems can operate at faster frequencies and lower voltages. Systems today, moreover, are expected to operate at more than one frequency and at more than one operating voltage or at least accommodate connections to other systems that operate at different voltages and frequencies.

There thus is an increasing need for a dynamic method to adjust clock control settings at different operating frequencies and at different operating voltages to adjust the timing margin of a clocked integrated circuit for particular applications.

SUMMARY OF THE INVENTION

This need has been be a method of optimizing the performance of an electronic system controlled by a clocked frequency, comprising the steps of: setting a frequency of a clock to a default; setting each of a plurality of clock control factors to a default parameter; running a test of the electronic system; incrementing the frequency and rerunning the test until the test fails; then changing at least one clock control factor and then incrementing the frequency and rerunning the test until the test fails; again, upon failure of the test, readjusting at least one clock control factor and repeating the cycle of incrementing the frequency, rerunning the test until the test fails, adjusting at least one clock control factor until a desired timing margin of the clock is achieved.

Setting each of the plurality of clock control factors to a default parameter may further comprise initializing one or more of the following default parameters of a phase-locked loop: the voltage gain of a voltage controlled oscillator within the phase-locked loop; current gain of the voltage controlled oscillator; range of the voltage controlled oscillator; the charge pump current; the damping factor; the gain of the phase detector; or the bandwidth. If a digital multiplier or a symmetry correction circuit is used to generate a clock, the step of setting a clock control factor to a default parameter may comprises setting the duty cycle.

The electronic system may comprise an array of semiconductor memory in which an ABIST test may be performed on the memory array. If the electronic system comprises digital logic circuits, an LBIST test may be performed on the digital logic circuits. In any event, where the electronic system comprises a clock distribution network, a semiconductor memory array, and digital logic circuits, functional tests may be performed.

The method of optimizing the performance as outlined above may be performed automatically for the clocked digital system in which a desired timing margin is preset, or the clock control settings and frequency can be manually adjusted to obtain a desired timing margin.

The invention is further embodied in an automated method of obtaining a desired timing margin of a clock in a clocked electronic system having a plurality of circuits, with the method comprising the steps of: inputting the desired timing margin; setting a default frequency; setting each of a plurality of clock control factors to a default parameter; generating a clock signal having the default frequency and default parameters; running a functional test of the clocked electronic system; incrementing the frequency; rerunning the functional test; and repeating the steps of running the functional test and incrementing the frequency until the test fails; if the clock signal is generating within a phase-locked loop (PLL), then the method further contemplates changing at least one of the following clock control factors: voltage gain of a voltage controlled oscillator within the PLL, current gain of the voltage controlled oscillator; range of the voltage controlled oscillator; the charge pump current, damping factor, phase detector gain, or bandwidth; if the clock signal is generated within a digital multiplier or a symmetry correction circuit, then upon failure of the test, the method contemplates adjusting the duty cycle of the clock signal; and then automatically repeating steps of incrementing the frequency and running the test until it fails at a particular frequency, then adjusting the clock control settings and then rerunning the test and incrementing the frequency, etc. until a desired timing margin and frequency of the clock is achieved.

The invention further is envisioned as an apparatus for controlling a timing margin of a clocked digital system, comprising a plurality of semiconductor logic and memory circuits; a means for generating a clock signal; a means to distribute the clock signal to the semiconductor logic and memory circuits; a means to test the semiconductor logic and memory circuits; a means to adjust the frequency of the clock signal; a means to adjust at least one clock control settings of the clock signal; and a means to adjust the timing margin based on results from the testing means with the frequency adjusting means and the clock control setting adjusting means.

The invention has been summarized, but will better be understood with reference to the Detailed Description of the Invention in conjunction with the Drawing in which:

DETAILED DESCRIPTION OF THE INVENTION

Figure 1:
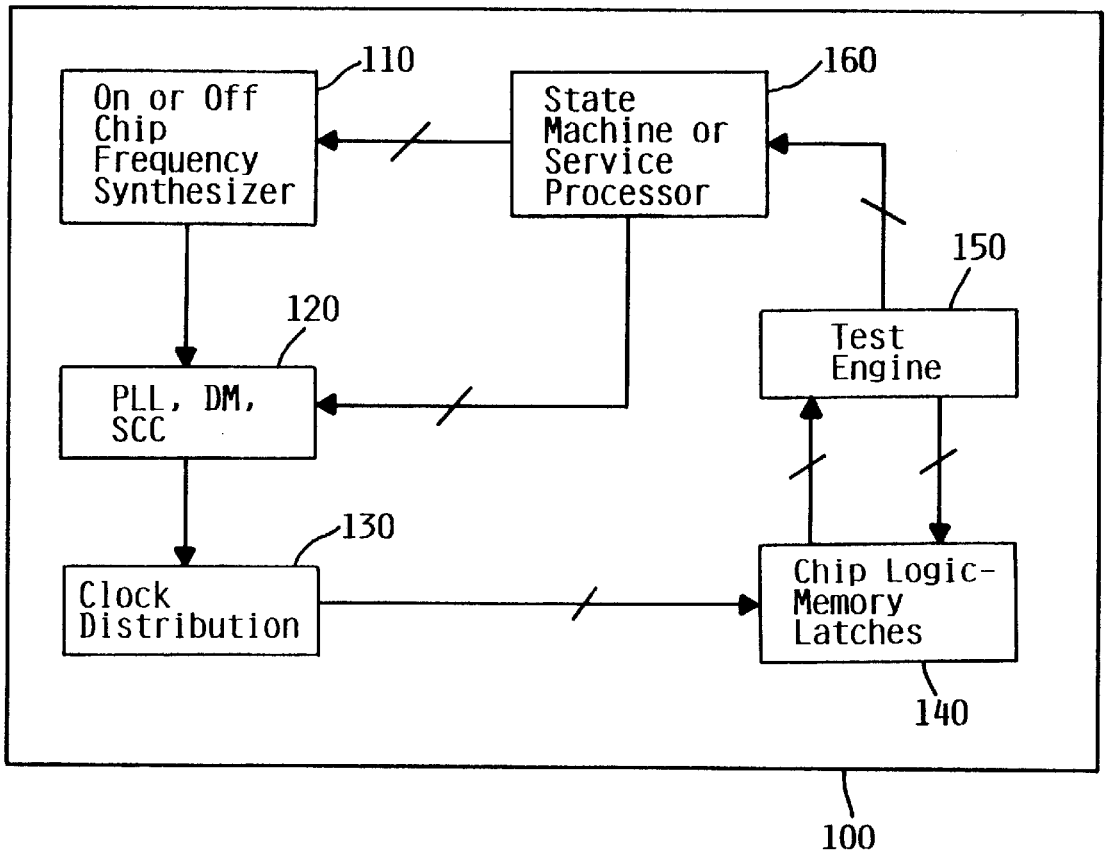
FIG. 1 is a simplified block diagram of a digital system having a distributed clock that can take advantage of the invention.

Referring now to the Drawing in which like elements have the same reference number on the different figures. FIG. 1 is a simplified block diagram of a clocked digital system 100. The clocked digital system comprises a multitude of integrated circuits fabricated from silicon CMOS, silicon-on-insulator, copper, or gallium arsenide or other known semiconductor logic technologies, such as a computer, bus arbitration unit, memory controller, service processor, etc. The clocked digital system 100 comprises a frequency synthesizer 110 to provide a periodic signal to the clocked digital system 100. The frequency synthesizer 110 may be located on the same integrated circuit or the same module in which the chip logic is located or it may be located off-chip. A clock generating circuit 120, such as a phase-locked loop (PLL), a digital multiplier (DM), or a symmetry correction circuit (SCC), receives the initial frequency and generates a clock pulse, as is known in the art of a series of high frequency signals, typically square waves. The data signal typically oscillates between two voltages, the high voltage representing a digital or logical "one" and the low voltage representing a digital or logical "zero." Typically both the clock and the data signal voltages are stable but may be programmable to operate at more than one voltage level, e.g., 5 volts, 3.3 volts, 1.8 volts, 1.5 volts or even lower. It is fully intended that the invention not be limited to only one voltage level but rather that the voltage level can be programmed according to the needs and environment of the clocked digital system 100.

From the clock generating circuit 120, the clock signal is distributed throughout the integrated circuits on the chip through a distribution network 130, as is known. The clock is distributed to the chip logic and to the latches of any memory device 140. Upon the arrival of one clock pulse, the latch or flip-flop changes state in order to receive a data signal whereupon the arrival of a subsequent clock pulse, the data or the logic state is latched through or captured in memory. Connected to the chip logic/memory devices 140 is a test engine 150 which is functionally connected to a service processor or an on-chip state machine 160. The state machine or service processor 160 is preferably enabled to run tests from the test engine 150, such as ABIST, LBIST, or other tests, which may be functional, from the main processor, software, or a service processor, any of which may be external or internal to the clocked digital system 100, to test its performance. The purpose of ABIST is to confirm that the memory arrays and registers retain input values whereas the purpose of LBIST is to test that the logic devices, latches, flip-fops, etc, are functioning properly at the appropriate operating frequency. A functional test sets up a sample program with known results and runs the program through the chip logic and memory latches 140. One or more of these tests can be run and the output of the tests are provided to the state machine and/or processor, whether it be the service processor or another processor running the tests. The state machine or service processor 160 is preferably located on the same chip as the integrated circuits in the chip logic or memory latches 140 to be tested and provides feedback to the frequency synthesizer 110.

Clock control settings can be programmed and are maintained in the state machine/service processor 160. For a PLL, bits in the state machine/service processor 160 can influence several parameters, which of course, control the clock signal promulgated throughout the clocked digital system 100. These clock control settings include, but are not limited to, the voltage and/or current gain of the voltage controlled oscillator (VCO), the range of the VCO, the charge pump current to drive the low pass filter in the PLL, the damping factor, the phase detector gain, and the bandwidth of the PLL. For a SCC, the duty cycle and/or symmetry can be adjusted. For the DM, the duty cycle can be controlled by a state machine/service processor 160. The above clock control settings and their effects on the timing or operating margin can easily be ascertained by one of skill in the art of clock generation and distribution. For instance, it is known that running the VCO at the higher end of its range adjusts the jitter by 50–100 picoseconds, as opposed to adjusting the gain of the VCO. For a DM, a change in the duty cycle of 50–100 picoseconds increases the operating or timing margin by ten percent for a two nanosecond clock. The clock control settings can be the bits that are input to the clock generator that can be used to adjust the output jitter or symmetry of clock signal distributed on the chip, whether the clock generation circuit be a PLL, a DM, or a SCC.

Figure 2:
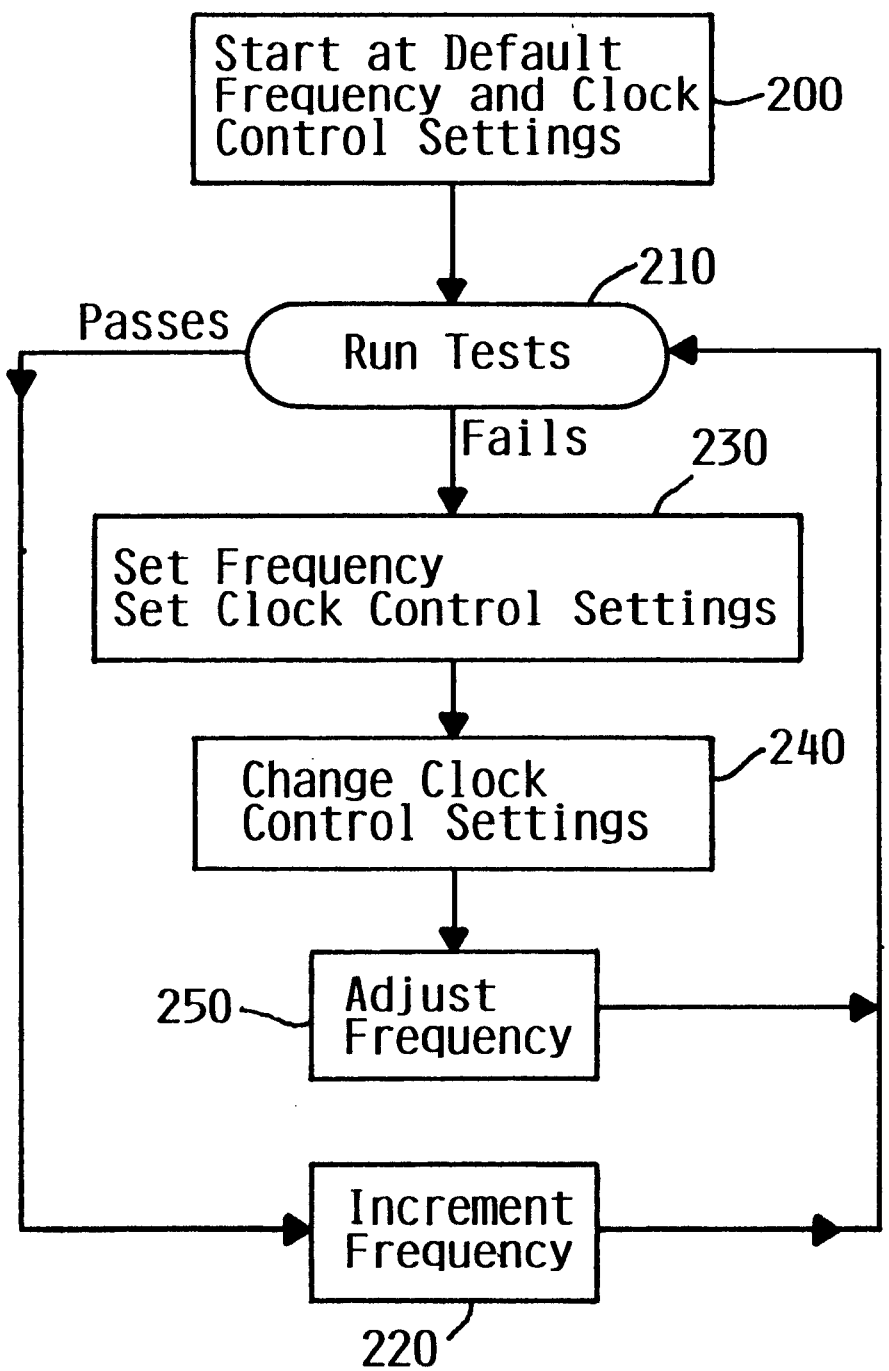
FIG. 2 is a simplified flow chart of a method to optimize clock frequency with clock control settings according to principles of the invention. It is suggested that FIG. 2 be printed on the first page of the patent.

With reference to FIG. 2, there is a simplified flow chart of an preferred embodiment of optimizing the clock control settings with respect to different frequencies. At step 200, a default frequency and default clock control settings are programmed in the state machine/service processor 160. In step 210, the service processor 160, an external processor, or test engine 150 initiates and runs LBIST, ABIST, and/or other logic and functional tests of the chip logic/memory latches 140. A series of known logic states are input into the chip's clock distribution system and/or its logic/memory latches 140 at a known frequency. The external processor or the state machine/service processor 160 compares the output of the chip logic/memory latches 140 and the other functional hardware tested to the known input to determine if and where any logic errors occur. If no errors occur, the service processor or state machine 160 provides feedback to the chip frequency synthesizer 110 to increment the clock frequency at step 220 and run the functional and/or logic tests again. This cycle of running the functional and/or logic tests and incrementing the frequency increases until the tests indicate an error or failure. The failing frequency and the clock control settings are logged in step 230 and are changed in step 240. The clock frequency is once again incremented at the new clock control settings in step 250 and the tests are run again as in step 210. With the new clock control settings, the tests are run at higher and higher frequencies by incrementing the frequency as in step 220 until the tests fail. Upon failure of the logic tests, the process then changes the clock control settings and increments the clock frequency as in steps 230 through 250 and the tests are run again. This sequence can be repeated until a clock control setting is found that provides an acceptable amount of operating or timing margin. In this fashion, the timing margin can be adjusted to either be minimal so the clock can run at the highest possible frequency or to be maximum to ensure that proper operation of the clocked digital system can occur.

Once the clock control setting is found that provides the desired timing margin, the service processor or on chip state machine 160 sets the clock control setting bits appropriately. Preferably, the method as described herein is performed at every initial program load (IPL) and at the frequency and clock control settings which allow optimal performance, the remaining IPL sequence continues. In some circumstances where the computer, the memory controller, or other digital system must reliably and accurately perform, it is preferable to have a larger timing or operating margin, e.g., 2%, whereas for computer or Internet games and applications, perhaps a timing margin on the order of 0.01% is acceptable. In computers having multiple processors, moreover, the processors must all operate at the same frequency. In these instances, then the operating or timing margin of each processor is determined at that frequency whose clock control settings may be different from another processor.

While the preferred embodiment of the invention has been illustrated and described, it will be clear that the invention is not so limited. Numerous modifications, changes, variations, substitutions and equivalents will occur to those skilled in the art without departing from the spirit and scope of the present invention as defined by the appended claims. Notwithstanding, it will be appreciated by those skilled in the art that the invention of the present application operates to provide a clock which will optimize, either through automated or manual iterations of the claimed process, the clock control settings in accordance with a given frequency for specific applications. Using the invention as described herein, the timing margin can be tuned for particular applications, different frequencies, and different operating voltages.

What is claimed is:

1. A method of optimizing the performance of an electronic system having a clocked frequency, comprising the steps of:
   (a) setting a frequency of a clock to a default;
   (b) setting each of a plurality of clock control factors to a default parameter;
   (c) running a test of said electronic system;
   (d) incrementing said frequency;
   (e) rerunning said test;
   (f) repeating steps (d) and (e) until said test fails;
   (g) changing at least one of said plurality of clock control factors;
   (h) repeating steps (d) through (g) until a desired timing margin of said clock is achieved.

2. The method of claim 1, wherein said step of setting each of said plurality of clock control factors to a default parameter further comprises initializing one or more of said default parameters of a phase-locked loop, said one or more default parameters selected from the group consisting of:
   (a) voltage gain of a voltage controlled oscillator within said phase-locked loop;

(b) current gain of said voltage controlled oscillator;

(c) range of said voltage controlled oscillator;

(d) charge pump current;

(e) damping factor;

(f) phase detector gain; and (g) bandwidth.

3. The method of claim 1, wherein said step of setting each of said plurality of clock control factors to a default parameter further comprises setting the duty cycle of a digital multiplier.

4. The method of claim 1, wherein said step of setting each of said plurality of clock control factors to a default parameter further comprises setting the duty cycle of a symmetry correction circuit.

5. The method of claim 1 wherein said electronic system comprises an array of semiconductor memory and said step of running said test further comprises running an ABIST test on said array.

6. The method of claim 1 wherein said electronic system comprises digital logic circuits and said step of running said test further comprises running a LBIST test on said digital logic circuits.

7. The method of claim 6 wherein said electronic system further comprises a clock distribution network and a semiconductor memory array, and said step of running said test further comprises running a functional test through said clock distribution network, said memory array, and said digital logic circuits.

8. The method of claim 1, wherein said steps are performed automatically for said clocked digital system in which said desired timing margin is preset.

9. The method of claim 1, wherein said clock control settings and said frequency can be manually adjusted to obtain said desired timing margin.

10. A automated method of obtaining a desired timing margin of a clock in a clocked electronic system having a plurality of circuits, said method comprising the steps of:

(a) inputting said desired timing margin;

(b) setting a default frequency;

(c) setting each of a plurality of clock control factors to a default parameter;

(d) generating a clock signal having said default frequency and said default parameters;

(e) running a functional test of said clocked electronic system;

(f) incrementing said frequency;

(g) rerunning said functional test;

(h) repeating steps (f) and (g) until said test fails;

(i) upon failure of said test, if said step of generating said clock signal is within a PLL, then changing at least one of said following plurality of clock control factors: voltage gain of a voltage controlled oscillator within said phase-locked loop; current gain of said voltage controlled oscillator; range of said voltage controlled oscillator; charge pump current; damping factor; phase detector gain; or bandwidth;

(j) upon failure of said test, if said step of generating said clock signal is within a DM or SCC, adjusting the duty cycle of said clock signal in said DM or said SCC; and (k) automatically repeating steps (f) through (j) until a desired timing margin and frequency of said clock is achieved.

11. An apparatus for controlling a timing margin of a clocked digital system, comprising:

(a) a plurality of semiconductor logic and memory circuits;

(b) means for generating a clock signal;

(c) means to distribute said clock signal to said semiconductor logic and memory circuits;

(d) means to test said semiconductor logic and memory circuits;

(e) means to adjust the frequency of said clock signal;

(f) means to adjust at least one clock control settings of said clock signal; and (g) means to adjust said timing margin based on results from said testing means with said frequency adjusting means and said at least one clock control setting adjusting means.

* * * * *